Nov. 24, 1959  G. A. LYON  2,914,355
WHEEL COVER
Filed Feb. 16, 1956
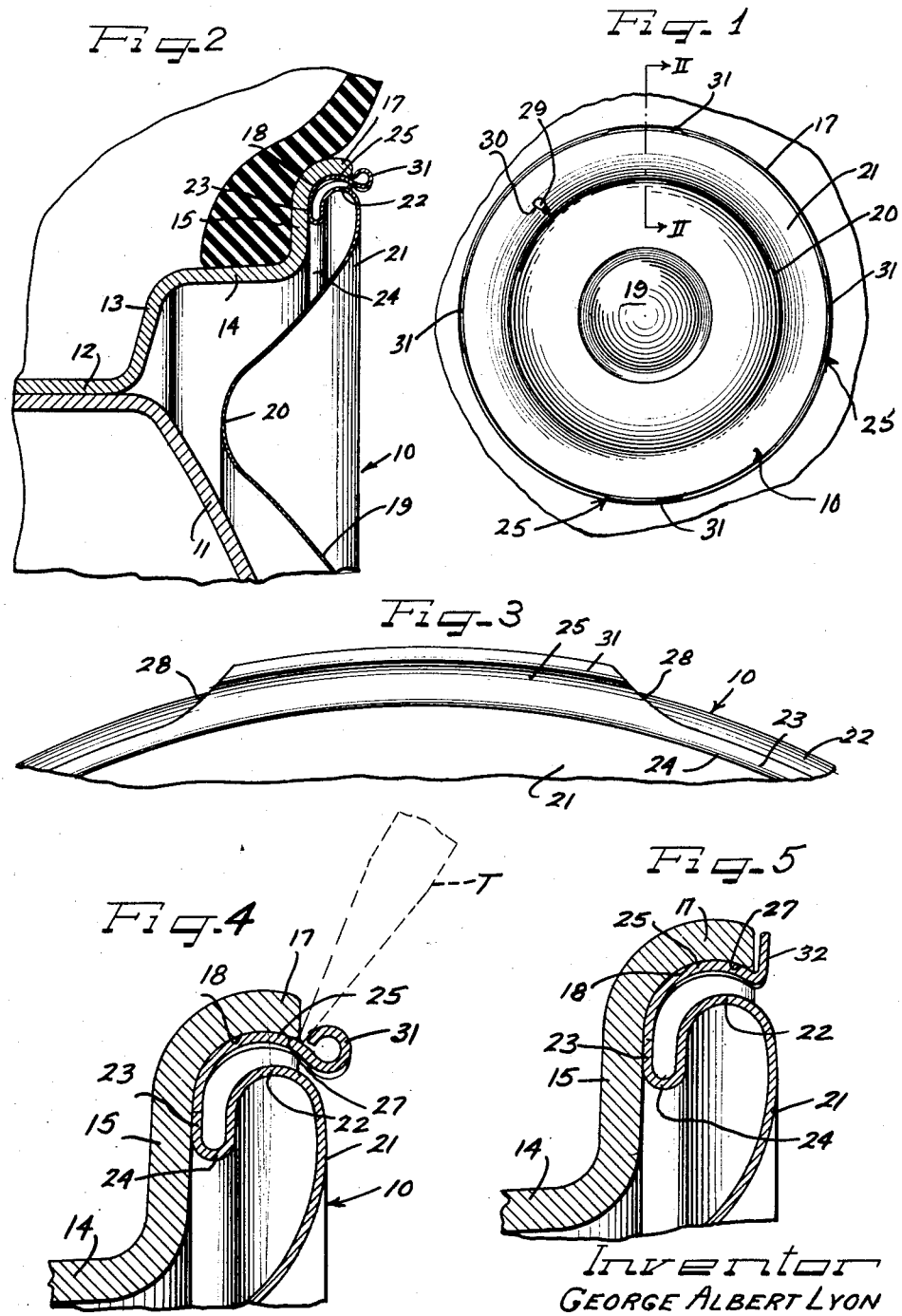
Inventor
GEORGE ALBERT LYON

United States Patent Office 2,914,355
Patented Nov. 24, 1959

2,914,355

WHEEL COVER

George Albert Lyon, Detroit, Mich.

Application February 16, 1956, Serial No. 565,864

10 Claims. (Cl. 301—37)

The present invention relates to improvements in wheel structures and more particularly concerns the ornamental and protective covering of the outer sides of vehicle wheels.

An important object of the present invention is to provide an improved wheel structure having novel means for snap-on pry-off retention of a cover on the outer side of the wheel.

Another object of the invention is to provide an improved retaining relation between a vehicle wheel tire rim and a wheel cover for disposition at the outer side thereof.

A further object of the invention is to provide improved retaining means on a wheel cover for retaining engagement with the terminal flange of a drop center type vehicle wheel tire rim.

Still another object of the invention is to provide improved resilient retaining clip means for vehicle wheel covers having structure thereon to facilitate prying the retaining means from retaining engagement with a vehicle tire rim part.

It is also an object of the invention to provide novel retaining clip means for wheel covers engageable shoulderingly with the terminal flange of a tire rim and with means on the clips projecting clear of the rim flange for engagement by a pry-off tool in removing the cover from the wheel.

Other objects, features and advantages of the present invention will be readily apparent from the following detailed description of certain preferred embodiments thereof taken in conjunction with the accompanying drawing, in which:

Figure 1 is an outer side elevational view of a wheel structure embodying features of the invention;

Figure 2 is a fragmentary radial sectional detail view taken substantially on the line II—II of Figure 1;

Figure 3 is a fragmentary rear elevational view of the cover of Figures 1 and 2 showing one of the retaining fingers thereon;

Figure 4 is a fragmentary sectional detail view substantially like Figure 2 but on a somewhat enlarged scale; and Figure 5 is a fragmentary sectional detail view similar to Figure 4 but showing a slight modification.

A wheel cover 10 is adapted to be disposed in covering ornamental and protective relation at the outer side of a vehicle wheel comprising the usual wheel body 11 supporting a tire rim that has a generally radially inwardly facing base flange 12 to which the wheel body is secured. At the outer side of the rim is a generally axially outwardly facing side flange 13 that connects the base flange to a generally radially inwardly facing annular intermediate flange 14. At its axially outer side the intermediate flange merges with a terminal flange that has a generally radially outwardly extending and axially outwardly facing juncture portion 15 and a generally axially outwardly extending lip terminus 17 provided with a generally radially inwardly facing and opening annular groove or channel 18.

In the present instance, the cover 10 is in the form of a one piece sheet metal disk of a diameter for substantially covering the outer side of the wheel including the wheel body and the tire rim. On the other hand, the cover might comprise a trim ring annulus which would cover only the tire rim and a portion of the wheel body with a hub cap at the center of the wheel. In any event, the features of the invention are concerned with the mode of attachment of the cover whether it be a full disk cover or a trim ring annulus. Therefore, the term "cover" is to be understood in its generic sense.

The cover 10 is made from suitable sheet metal such as stainless steel, brass or aluminum or the like preferably of a quality that is work hardenable to attain resilient characteristics therein.

As shown in Figures 1 and 2, the cover 10 includes a central crown portion 19 for overlying the wheel body and joined by an annular inwardly dished intermediate portion 20 to a radially and axially outwardly directed annular outer marginal portion 21 for substantially overlying the tire rim. At its outer extremity the marginal portion 21 is provided with an underturned rib-like annular flange 22 of substantial radius but a shorter radius than the radius of the groove or channel 18 of the tire rim lip 17. Moreover, the outer diameter extremity of the underturned flange 22 is substantially less than the diameter within the groove 18 so that the underturned flange 22 will overly the inner portion 15 of the terminal flange but will be spaced radially inwardly from the lip portion 17.

For snap-on, pry-off retention of the cover on the wheel, the underturned flange 22, which provides a substantially stiff reinforced marginal rib for the cover, has a further turn back or return bent generally radially outwardly extending preferably continuous annular flange terminus 23 joined to the main body of the flange 22 on a short radius juncture bend 24 which additionally reinforces and stiffens the cover margin.

Projecting generally radially and axially outwardly, as extensions integrally in one piece from the terminal flange 23, is a series of circumferentially spaced curved retaining fingers 25 which provide radially outwardly projecting and generally axially outwardly facing resilient gripping shoulders generally complementary in curvature to the curvature of the groove 18 of the terminal flange lip 17 so as to be retainingly resiliently grippingly engageable within the groove 18 and more particularly behind an annular generally radially and axially inwardly facing shoulder 27 provided by the lip 17 at the axially outer side of the groove 18. The construction and relationship is such that although the retaining fingers 25 normally project at least to slightly radially outwardly greater diameter than the diameter within the groove 18, the fingers are compressed and placed under resilient tension incident to pressing the cover home on the wheel and more particularly in snapping the fingers 25 into the groove 18 behind the shoulder 27.

It will be observed in Figs. 1 and 3, that there may be four of the fingers 25, although they may be more or less in number, and that the fingers are of substantial width with the shoulders thereof arcuate concentric with the circumference of the circular wheel rim flange and of the circular cover body, with opposite sides 28 of the fingers tapered for additional resilient stiffness. This taken together with the shortness of the fingers 25 assures a quite stiff resilience thereof and thus strong resiliently outward tensioned thrust of the fingers into the groove 18 and behind the shoulder 27 to afford a grip that will highly resist any tendency toward dislodgment of the cover from the wheel and also to maintain the cover seated firmly at the flange terminal 23 against the terminal flange portion 15. It will be observed that there is ample space between the turned marginal flange 22 and the terminal flange lip 17 for radial flexing of the fingers 25 in application and removal of the cover wherein the fingers must flex past the radially inner terminus of the shoulder 27 of the terminal flange lip.

In applying the cover to the wheel, of course, a valve stem 29 is centered with respect to a valve stem aperture 30 in the cover portion 21.

In view of the strong resilient gripping characteristics of the retaining fingers 25 behind the rim flange shoulder 27, means are provided to facilitate pry-off when desired. In a highly desirable form, such means comprise a terminal extension on one or more of the fingers 25, comprising in each instance an integral projection from the free or distal end portion of the finger to project in assembly with the wheel beyond the tip of the terminal flange lip 17 so as to be engageable with a pry-off tool such as a screw driver T shown schematically in Fig. 4. The pry-off terminal may be in the form of an outturned curled bead 31 as shown in Fig. 4, or in the form of a generally radially outwardly projecting short angular terminal flange 32 as shown in Fig. 5. In either event, the terminal is arranged to overly in preferably slightly spaced relation the tip extremity of the terminal flange lip 17. Thereby the pry-off tool T may conveniently be inserted behind the pry-off terminal 31 or 32, as the case may be, and then by exerting appropriate leverage the retaining finger is pried axially outwardly out of engagement with the terminal flange shoulder 27.

As will be observed in Figures 2, 4 and 5, the reinforcing and pry-off turned terminal flange structures 31 and 32 at their radially outermost extent are within the perimeter of the radially outer surface of the terminal flange 17 so as to be clear of interference with or stress contact by the opposing wall portion of the tire carried by the tire rim.

It will also be appreciated, of course, that since the pry-off terminal 31 or 32, as the case may be, is disposed angularly to the body of the retaining finger 25 and extends preferably throughout the circumferential extent of the finger tip substantial reinforcement and resiliency enhancement is afforded by the turned terminal. Such reinforcement is also advantageous in protecting the fingers against damage in handling or shipment since, as is apparent the fingers project radially beyond the adjacent reinforced margin of the cover.

It will be understood that modifications and variations may be effected without departing from the scope of the novel concepts of the present invention.

I claim as my invention:

1. In a wheel structure including a tire rim having a terminal flange, a cover member for disposition at the outer side of the tire rim and having retaining spring fingers retainingly engageable with the terminal flange, with a pry-off projection on at least one of the fingers arranged to project axially outwardly beyond the tip of the terminal flange for engagement by a pry-off tool.

2. In a wheel structure including a tire rim having a terminal flange, a cover member for disposition at the outer side of the tire rim and having retaining spring fingers retainingly engageable with the terminal flange, with a pry-off projection on at least one of the fingers arranged to project axially outwardly beyond the tip of the terminal flange for engagement by a pry-off tool, said projection comprising a generally radially outwardly turned flange for overlying the tip of the terminal flange in pry-off tool gap relation.

3. In a wheel structure including a tire rim having a terminal flange providing a generally radially inwardly opening annular groove affording a generally radially and axially inwardly facing shoulder at the axially outer side thereof, a cover for disposition at the outer side of the wheel including a circular cover body having an underturned outer marginal flange equipped with generally radially and axially outwardly turned retaining fingers resiliently engageable under tension in cover retaining relation within said groove behind said shoulder, at least one of said fingers having a terminal flange thereon projecting generally radially outwardly over the tip of the rim flange for engagement by a pry-off tool, said terminal flange of the finger at its radially outermost extent being within the perimeter of the radially outer side surface of the terminal flange so as to be clear of interference with or stress contact by an opposing wall portion of a tire carried by the tire rim.

4. In a wheel structure including a tire rim having a turned terminal flange providing generally radially inwardly facing annular groove, a cover for disposition at the outer side of the wheel including a circular cover member having an outer marginal turned flange of a diameter to be received concentrically wtihin the grooved terminal flange in radially inwardly spaced relation thereto and equipped with return bent retaining spring fingers having spring legs that extend generally radially and axially outwardly and are shouldered to engage within said groove in the space between said underturned flange and the bottom of said groove for retaining the cover on the wheel, at least one of said fingers having a terminal projecting generally axially outwardly from the gap between the turned cover flange and the terminal flange and affording a pry-off tool engageable shoulder.

5. In a wheel cover for disposition at the outer side of a vehicle wheel, a circular cover body member having a marginally generally S-shaped underturned continuous circular flange provided integrally in one piece therewith with generally radially and axially outwardly extending cover retaining fingers of substantial width and curved on generally the circumference of the cover as well as generally complementary but in spaced relation to the outermost portion of the turned flange, with an angular reinforcing and pry-off terminal on at least one of said fingers.

6. In a wheel cover for disposition at the outer side of a vehicle wheel, a circular cover body member having a marginally generally S-shaped underturned continuous circular flange provided integrally in one piece therewith with generally radially and axially outwardly extending cover retaining fingers of substantial width and curved on generally the circumference of the cover as well as generally complementary but in spaced relation to the outermost portion of the turned flange, with an angular reinforcing and pry-off terminal on at least one of said fingers, said terminal projecting generally axially and radially beyond the turned cover flange.

7. In a cover for disposition at the outer side of a vehicle wheel, a circular cover member having a marginal underturned continuous circular flange of substantially S-shape with a large loop portion at juncture with the cover body and a small loop portion at the terminus of the flange, with said small loop portion provided with a circumferentially spaced series of turned cover retaining fingers extending in generally axial direction and facing radially toward said large loop portion in radially spaced relation to yield resiliently generally radially toward said large loop portion.

8. In a cover for disposition at the outer side of a vehicle wheel, a circular cover member having a marginal underturned continuous circular flange of substantially S-shape with a large loop portion at juncture with the cover body and a small loop portion at the terminus of the flange, with said small loop portion provided with a circumferentially spaced series of turned cover retaining fingers, said fingers being provided with angular reinforcing and pry-off terminals turned away from said large loop portion.

9. A wheel structure as defined in claim 3 wherein said finger terminal flange comprises a turned bead.

10. A wheel structure as defined in claim 3 wherein the finger terminal flange comprises a generally radially outwardly extending substantially straight angularly disposed flange portion.

References Cited in the file of this patent

UNITED STATES PATENTS

| | | |
|---|---|---|
| 2,490,822 | Lyon | Dec. 13, 1949 |
| 2,533,934 | Henchert | Dec. 12, 1950 |
| 2,584,452 | Horn | Feb. 5, 1952 |
| 2,624,638 | Lyon | Jan. 6, 1953 |
| 2,654,637 | Lyon | Oct. 6, 1953 |
| 2,669,487 | Horn | Feb. 16, 1954 |
| 2,671,695 | Lyon | Mar. 9, 1954 |